United States Patent [19]

Tomiyama et al.

[11] Patent Number: 5,307,612
[45] Date of Patent: May 3, 1994

[54] LAWN MOWER HAVING A STEERING HANDLE SWITCHABLE BETWEEN A WALKING MODE AND A RIDING MODE

[75] Inventors: Yoshio Tomiyama; Junichi Kitamura, both of Sakai, Japan

[73] Assignee: Kubota Corporation, Osaka, Japan

[21] Appl. No.: 31,250

[22] Filed: Mar. 12, 1993

[30] Foreign Application Priority Data

May 28, 1992 [JP] Japan .................. 4-136465

[51] Int. Cl.$^5$ .................. A01D 34/68; A01D 34/82
[52] U.S. Cl. .................. 56/11.1; 56/11.8; 56/11.5; 56/16.9; 56/DIG. 18
[58] Field of Search .................. 56/10.8, 11.1, 11.2, 56/11.3, 11.4, 11.5, 11.8, 13.5, 15.7, 15.8, 16.9, DIG. 6, DIG. 18

[56] References Cited

U.S. PATENT DOCUMENTS

| | | | |
|---|---|---|---|
| 4,881,361 | 11/1989 | Dalton | 56/10.8 X |
| 4,934,989 | 6/1990 | Furukawa et al. | 474/135 |
| 4,957,183 | 9/1990 | Mullett et al. | 180/234 |
| 5,085,043 | 2/1992 | Hess et al. | 56/10.8 X |
| 5,239,810 | 8/1993 | Gugel | 56/10.8 |

Primary Examiner—Terry Lee Melius
Attorney, Agent, or Firm—Webb, Burden, Ziesenheim & Webb

[57] ABSTRACT

A lawn mower for use in a walking mode and a riding mode, having a chassis frame, an engine mounted on a rearward position of the chassis frame, front wheels, driven rear wheels, transmissions for transmitting drive from the engine to the rear wheels after varying speed of the drive, a grass cutting unit suspended from the chassis frame, a driver's seat mounted on the chassis frame, and a handle post supporting control levers for controlling the transmissions. The handle post is pivotable between a first position for the walking mode in which the control levers are disposed rearwardly of the chassis frame, and a second position for the riding mode in which the control levers are disposed adjacent the driver's seat. The handle post includes a vertical post portion extending laterally of the lawn mower, and a horizontal post portion curved from the vertical post portion to extend transversely of the lawn mower. The control levers are provided on the horizontal post portion.

7 Claims, 5 Drawing Sheets

LAWN MOWER HAVING A STEERING HANDLE SWITCHABLE BETWEEN A WALKING MODE AND A RIDING MODE

BACKGROUND OF THE INVENTION

1. Field of the Invention

The present invention relates to a lawn mower for use in a walking operator mode and a riding operator mode.

2. Description of the Related Art

A riding type lawn mower, as disclosed in U.S. Pat. No. 4,957,183, has an engine mounted on a front portion of a vehicle body, a driver's section disposed rearwardly, and a grass cutting unit underslung between front and rear wheels. The mower runs on the wheels driven respectively by hydraulic motors, and is steerable by turning the wheels up to about 90 degrees with a steering wheel disposed in the center and forwardly of a driver's seat.

The riding type lawn mower having the above construction is capable of a small, sharp turn with the center of turning moved to a position inwardly of a peripheral edge of the grass cutting unit. This turning capability provides the advantage of realizing an efficient grass cutting operation leaving no uncut patches. However, since the engine is mounted forwardly of the driver's section, the mower has an extensive fore and aft length. Consequently, the driver has difficulties in observing grass patches ahead of the mower during a grass cutting run. In addition, when boarding and alighting from the mower, the driver has the inconvenience of having to move through a narrow space between the driver's seat and steering wheel.

In the case of walking operator type lawn mower, one known example, as disclosed in U.S. Pat. No. 4,934,989, has a grass cutting unit mounted between caster type front wheels and engine-driven rear wheels, and control levers extending rearwardly for a walking operator to steer the mower. This lawn mower is easily controllable by operating transmission clutches provided for the rear wheels, respectively. It is possible to drive the mower along a complicated curve to engage in a grass cutting operation. However, when the mower is caused to run along a long straight line, the operator must follow the mower in a tedious walk. The walking operator type lawn mower has a low reputation for use in an operation involving such long straight walks.

As further examples, Applicants have disclosed lawn mowers for use in a walking mode as well as a riding mode, in U.S. patent applications Ser. No. 07/865,726 filed Apr. 8, 1992 and Ser. No. 07/874,647 filed Apr. 27, 1992. In each of these mowers, front control levers disposed adjacent a driver's seat and rear control levers arranged rearwardly of a vehicle body are operatively connected to transmissions for varying drive speeds of right and left rear wheels, respectively. The user may freely choose to use this type of lawn mower in the walking mode or in the riding mode. However, this type of lawn mower has the disadvantage of requiring a complicated link mechanism to allow the transmissions to be controlled both by the front control levers and by the rear control levers. As a further disadvantage, the rear control levers are obstructive when the mower is used in the riding mode, and the front control levers when the mower is used in the walking mode.

SUMMARY OF THE INVENTION

The object of the present invention is to provide a simplified control lever mechanism for a lawn mower usable in a walking mode and a riding mode.

The above object is fulfilled, according to the present invention, by a lawn mower for use in a walking mode and a riding mode, comprising control means for controlling transmissions for changing speed of driven wheels, the control means being pivotable between a first position for the walking mode, and a second position for the riding mode, wherein the control means includes a cross pin mounted on a chassis frame, a handle post pivotable about the cross pin between the first position and the second position, the handle post including a vertical post portion extending laterally of the lawn mower, and a horizontal post portion curved from the vertical post portion to extend transversely of the lawn mower, and control levers provided on the horizontal post portion.

According to the above construction, when the operator steers the mower while walking behind it, the handle post is set to the first position for the walking mode, with the control levers disposed rearwardly and upwardly of the mower. When the operator rides the mower in a grass cutting operation, the handle post is set to the second position for the riding mode, with the control levers disposed adjacent a driver's seat. In this way, the handle post is pivotable selectively between the two positions according to the steering modes. The above construction eliminates the inconvenience encountered where separate handle posts are provided for the two steering modes, i.e. when one of the handle posts is used, the other becomes obstructive. Moreover, since the handle post includes a vertical post portion extending laterally of the lawn mower and a horizontal post portion curved from the vertical post portion to extend transversely of the lawn mower, one side of the driver's seat is open when the handle post is switched to the position for the riding mode. Consequently, the operator may board and alight from the mower with ease.

In a preferred embodiment of the invention, the handle post is formed of a hollow pipe for receiving control wires interlocking the control levers to the transmissions. This provides an advantage of a very neat steering control line, with no possibility of the control wires becoming entangled.

Other features and advantages of the present invention will be apparent from the following description of the preferred embodiment of the invention taken with reference to the accompanying drawings.

DETAILED DESCRIPTION OF THE PREFERRED EMBODIMENT

An embodiment of the present invention will be described hereinafter with reference to the drawings.

Figure 1:
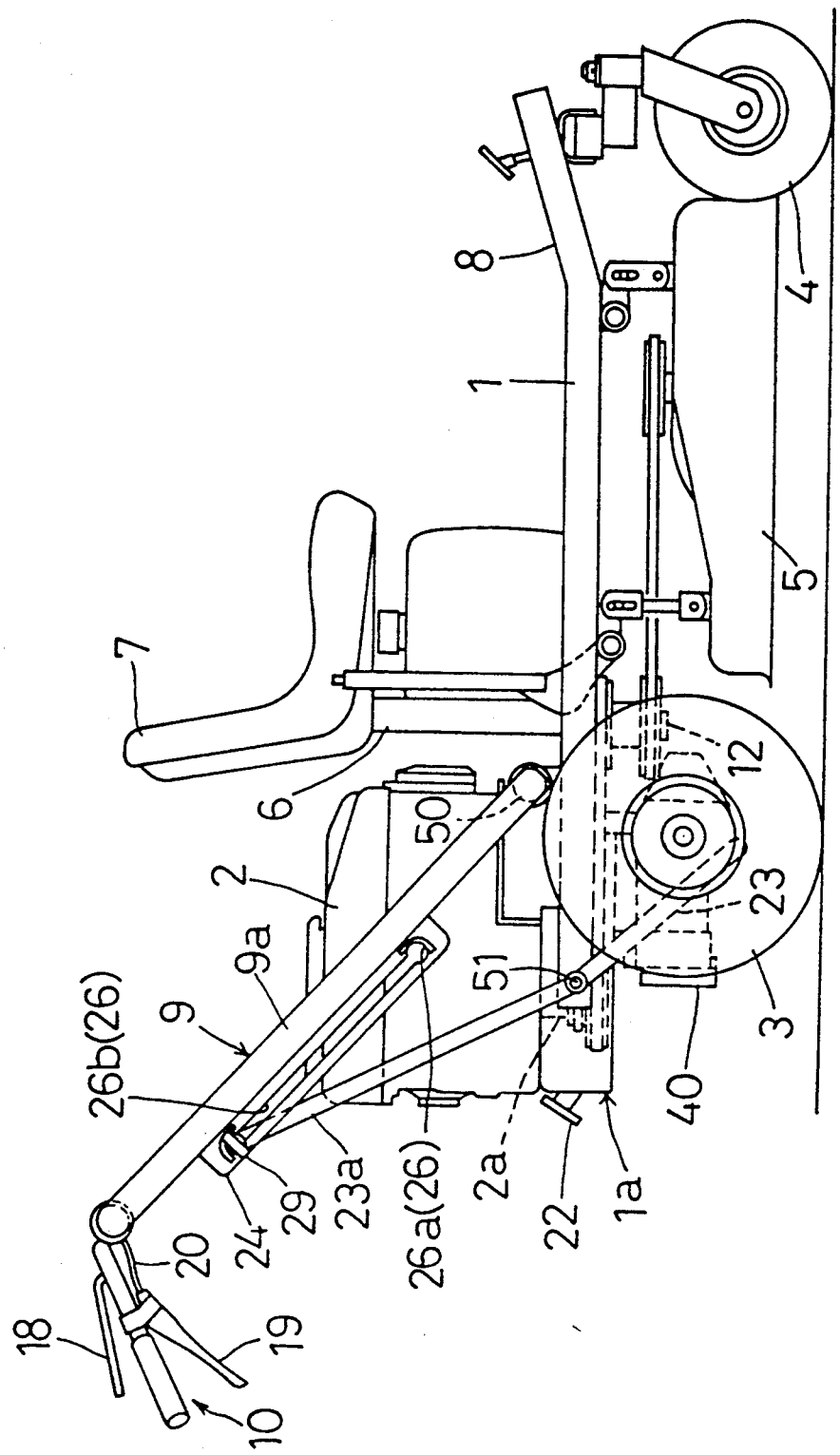
FIG. 1 is a side elevation of a lawn mower in a walking mode according to the present invention.
Figure 2:
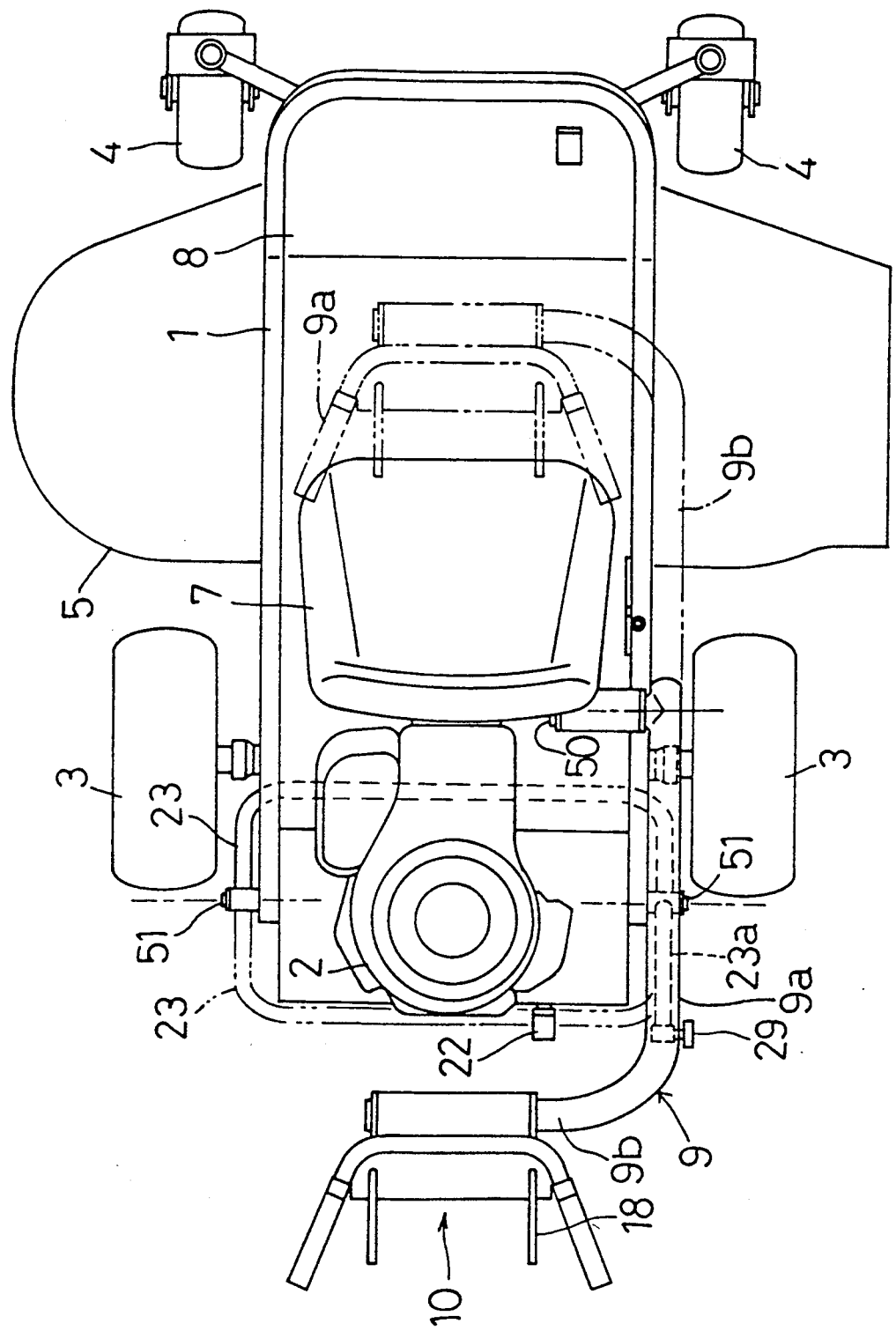
FIG. 2 is a plan view of the lawn mower in the walking mode.
Figure 3:
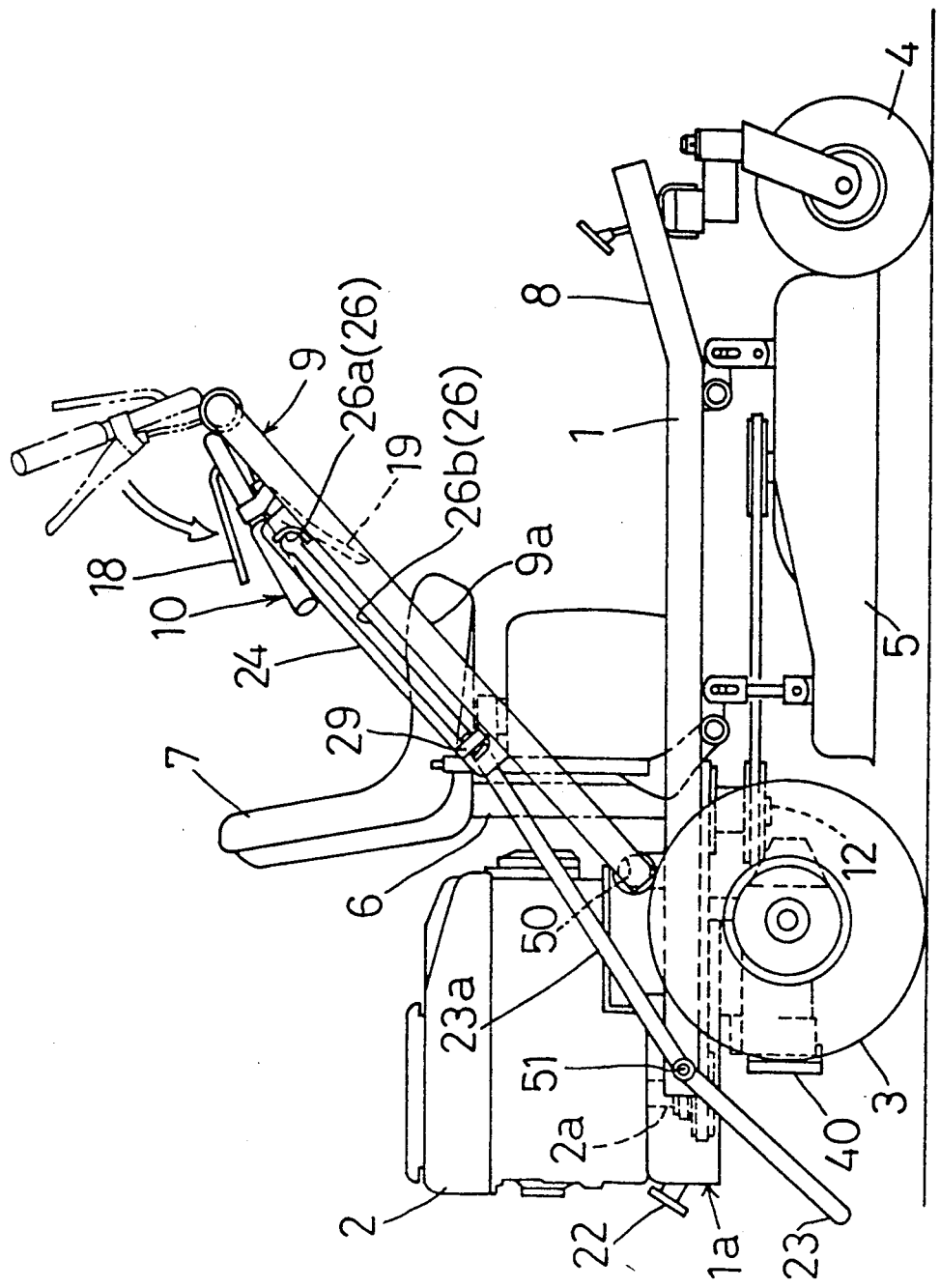
FIG. 3 is a side elevation of the lawn mower in a riding mode.

FIG. 1 shows a lawn mower having a chassis frame 1 extending longitudinally thereof. The chassis frame 1 supports an engine 2 mounted rearwardly thereof and having a vertical output shaft 2a. Right and left rear drive wheels 3 are disposed below the engine 2, and caster type right and left front wheels 4 are disposed at a forward end of the chassis frame 1. A grass cutting unit 5 is underslung between the front wheels 4 and rear wheels 3 to be vertically adjustable relative to the chassis frame 1. A driver's seat 7 is supported on a support member 6 erected on the chassis frame 1 forwardly of the engine 2. Only a floor step 8 is provided forwardly of the driver's seat 7, so that a seated operator may have a good forward view. The chassis frame 1 further supports a horizontal cross pin 50 mounted in a rearward position and extending transversely thereof. A steering handle post 9 is connected to the cross pin 50 to be pivotable longitudinally of the mower. Specifically, the handle post 9 includes a vertical post portion 9a connected to a lateral end of the cross pin 50, and a horizontal post portion 9b curved approximately 90 degrees from the vertical post portion 9a to extend transversely of the mower. As seen from FIG. 2, the vertical post portion 9a extends laterally of the mower, so that the handle post 9 is pivotable without interfering with other components. The horizontal post portion 9b provides a steering section 10. With this construction, when the handle post 9 is swung to a rearward or first position as shown in FIG. 1, the operator may control the steering section 10 while walking behind the mower. When the handle post 9 is swung to a forward or second position as shown in FIG. 3, the operator may control the steering section 10 while being seated on the driver's seat 7.

Figure 4:
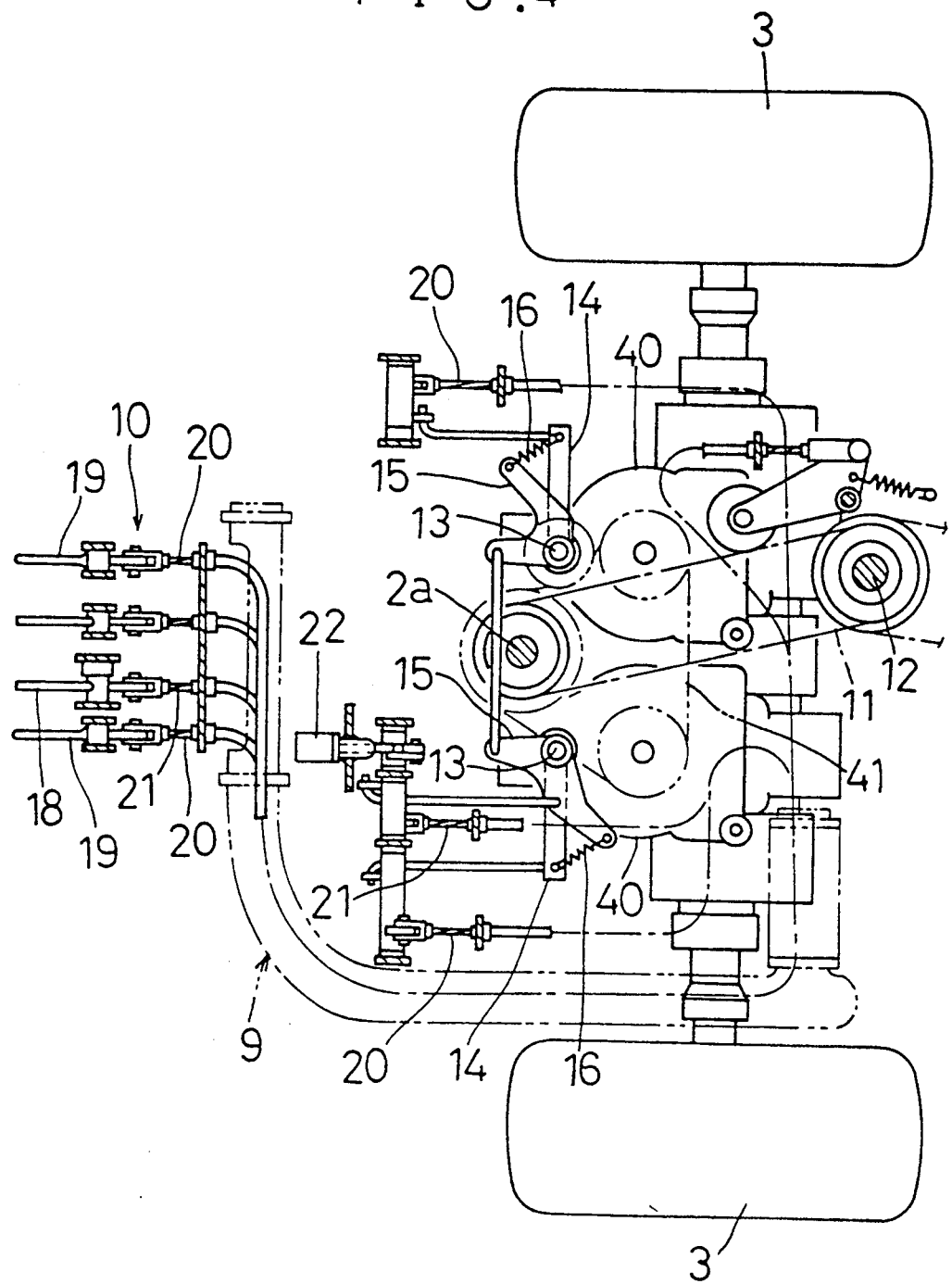
FIG. 4 is a plan view of a speed control system.

Referring to FIG. 4, the mower has a transmission system for transmitting power from the output shaft 2a of the engine 2 to a pair of right and left hydrostatic stepless transmissions 40 through a transmission belt 41, and to the grass cutting unit 5 through a different transmission belt 11 and a vertical relay shaft 12. The rear wheels 3 are driven individually by the right and left hydrostatic stepless transmissions 40. The transmissions 40 are controllable by control levers 18 and 19 included in the steering section 10. Specifically, as shown in FIG. 4, each transmission 40 has a shift control shaft 13 rotatable with pivotal movement of a shift arm 14 mounted thereon, and a control arm 15 mounted on the shift control shaft 13 to be pivotable relative thereto. The shift arm 14 and control arm 15 are interlocked through a spring 16 to follow movement of each other. The control arm 15 is controllably interlocked to one of the control levers 18 in the steering section 10. The control lever 18 is operable to cause the control arm 15 to pivot from a neutral position in a forward accelerating direction of the hydrostatic stepless transmission 40. The shift arm 14 also makes pivotal movement following the pivotal movement of the control arm 15 through the spring 16. As a result, the right and left rear wheels 3 are accelerated to substantially the same forward speed. Each shift arm 14 is operable when the operator grips one of the right and left control levers 19 included in the steering section 10 of the handle post 9, to pivot from the neutral position in a decelerating direction of the hydrostatic stepless transmission 40. When, for example, the operator grips one of the control levers 19 during a straight forward run caused by operation of the control levers 18, the shift arm 14 interlocked to the control lever 19 gripped is operated in the decelerating direction against the spring load. This causes the mower to make a turn. When the control levers 19 are gripped hard in a standstill condition, the mower is driven backward. Each control lever 18 is retainable in a desired control position by a frictional retainer such as a belleville spring mounted in an interlocking line thereof.

Figure 5:
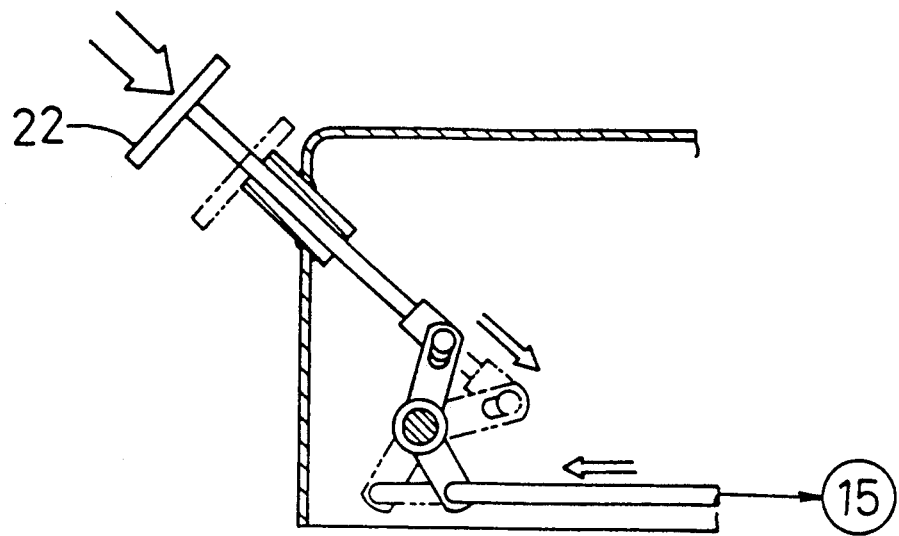
FIG. 5 is a fragmentary side view of a foot pedal.

The grip control levers 19 are interlocked to the shift arms 14 through control wires 20, respectively. The control levers 18 are interlocked to the control arms 15 through control wires 21, respectively. The control wires 20 and 21 extend through the handle post 9 formed of a pipe, so that the wires 20 and 21 do not become caught on other components as a result of pivotal movement in any direction of the handle post 9. As shown in FIG. 5, a foot pedal 22 is provided at the rear end of the mower to act on intermediate positions of the interlocking lines extending to the control arms 15. Operation of the pedal 22 stops the mower driven with the right and left control levers 19 gripped.

The steering section 10 is pivotable about a transverse axis and fixable to a selected position relative to the horizontal post portion 9b. Thus, the steering section 10 may be set to an optimal position regardless of positions to which the handle post 9 is pivoted.

Figure 6A:
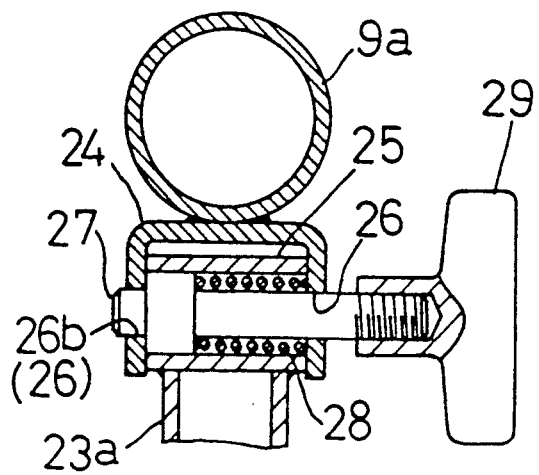
FIGS. 6A and 6B are sectional views showing a lock mechanism in a position to unlock a steering handle and a position to lock the steering handle, respectively.
Figure 6B:
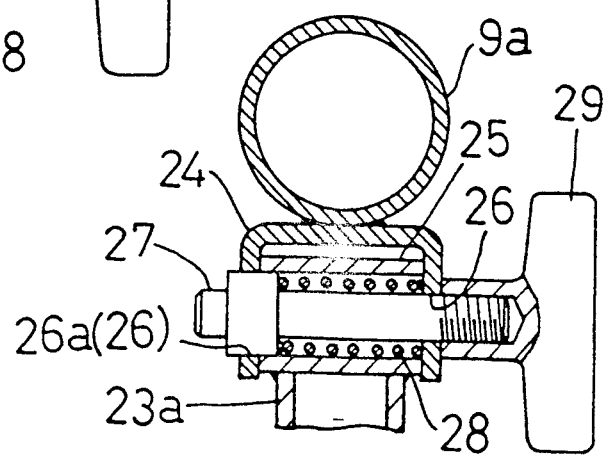

The mower further includes an auxiliary frame 23 disposed rearwardly of the chassis frame 1 to be pivotable about cross axes 51 supported at opposite sides thereof to act as a bumper when the mower is used in the riding mode. The auxiliary frame 23 is interlocked to the handle post 9 to be pivotable with pivotal movement of the latter between an operative position projecting rearwardly and downwardly of the mower, and a contained position retracted forwardly and inwardly of the mower. The auxiliary frame 23 includes a looped lower portion projecting downwardly of the chassis frame 1, and a support arm portion 23a extending upward from one of the cross axes 51. The support arm portion 23a is slidably engaged at an upper end thereof with a guide rail 24 fixedly extending along the vertical post portion 9a. The upper end of the support arm portion 23a is automatically lockable to an upper end or a lower end of the guide rail 24. The cross axes 51 of the auxiliary frame 23 are disposed rearwardly of the cross pin 50 of the handle post 9. As shown in FIGS. 6A and 6B, the guide rail 24 has a C-shaped cross section for receiving a boss 25 formed at the upper end of the support arm portion 23a. A stepped shaft 27 slidably extends through the boss 25 and engaging slots 26 formed in opposite walls of the guide rail 24. One of the engaging slots 26 defines enlarged upper and lower ends 26a, and a narrow intermediate passage 26b. The shaft 27 has a large diameter portion which, under the force of a spring 28, is engageable with and retainable in the enlarged upper and lower ends 26a of the engaging slot 26 (FIG. 6B). By pulling a control knob 29 of the shaft 27 against the force of spring 28, the shaft 27 may be allowed to slide along the narrow intermediate passage 26b (FIG. 6A).

Thus, the auxiliary frame 23 is automatically switchable between the contained position and operative position with switching of the handle post 9 between the first position (for the walking mode) and second position (for the riding mode). In the walking mode, the auxiliary frame 23 is retracted upwardly from an area of the feet of the walking operator to present no obstruction. In the riding mode, the auxiliary frame 23 is used reliably as a bumper or the like without requiring a special position switching operation (FIG. 3). The steering handle 9 has an inverted L-shape formed by the vertical post portion 9a and horizontal post portion 9b. When the steering handle 9 is set to the position for the riding mode, one side of the driver's seat 7 is open to allow the operator to board and alight from the mower with ease. The boarding and alighting side is opposite to the side where the grass cutting unit 5 discharges grass clippings.

What is claimed is:

1. A lawn mower for use in a walking mode and a riding mode, comprising:
   a chassis frame;
   an engine mounted on a rearward position of said chassis frame;
   at least one front wheel;
   driven rear wheel means;
   transmission means for transmitting drive from said engine to said rear wheel means, said transmission means including change speed means for changing speed of said rear wheel means;
   a grass cutting unit suspended from said chassis frame;
   a driver's seat mounted on said chassis frame; and
   control means for controlling said change speed means, and switchable between a first position for the walking mode, and a second position for the riding mode, said control means including:
   a cross pin mounted on said chassis frame;
   a handle post pivotable about said cross pin between said first position and said second position, said handle post including a vertical post portion extending laterally of the lawn mower, and a horizontal post portion curved from said vertical post portion to extend transversely of the lawn mower; and
   control lever means provided on said horizontal post portion.

2. A lawn mower as defined in claim 1, wherein said handle post is formed of a hollow pipe for receiving control wires interlocking said control lever means to said change speed means.

3. A lawn mower as defined in claim 1, wherein said handle post includes lock means for locking said handle post to a selected one of said first position and said second position.

4. A lawn mower as defined in claim 3, wherein said lock means includes cross axes mounted on said chassis frame, a support arm pivotable about said cross axes, a guide rail attached to said handle post for movably engaging one end of said support arm, and a lock member for locking said one end of said support arm to said guide rail.

5. A lawn mower as defined in claim 4, wherein said support arm has the other end connected to an extension frame extending in loop from through a lower region of the lawn mower, said extension frame acting as a rear bumper when said support arm is pivoted to said second position.

6. A lawn mower as defined in claim 1, wherein said rear wheel means includes a right rear wheel and a left rear wheel, and said change speed means includes a right transmission and a left transmission for driving said right and left rear wheels, respectively, said control means being operable to provide a steering control by controlling said transmissions to differentiate speed of said right and left rear wheels.

7. A lawn mower as defined in claim 1, wherein said handle post is connected to auxiliary frame means, said auxiliary frame means including a support arm interlocked to said handle post, and an extension frame extending through a lower region of the lawn mower, said extension frame acting as a rear bumper when said support arm is pivoted to said second position.

* * * * *